(No Model.)
H. STOCKHEIM.
MEANS FOR FILTERING.
No. 363,019. Patented May 17, 1887.
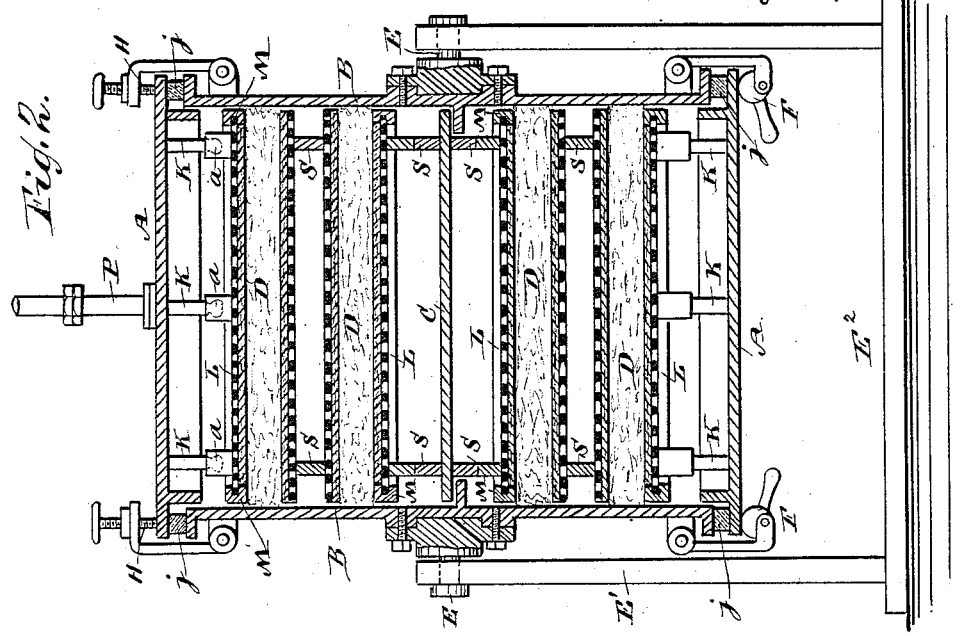
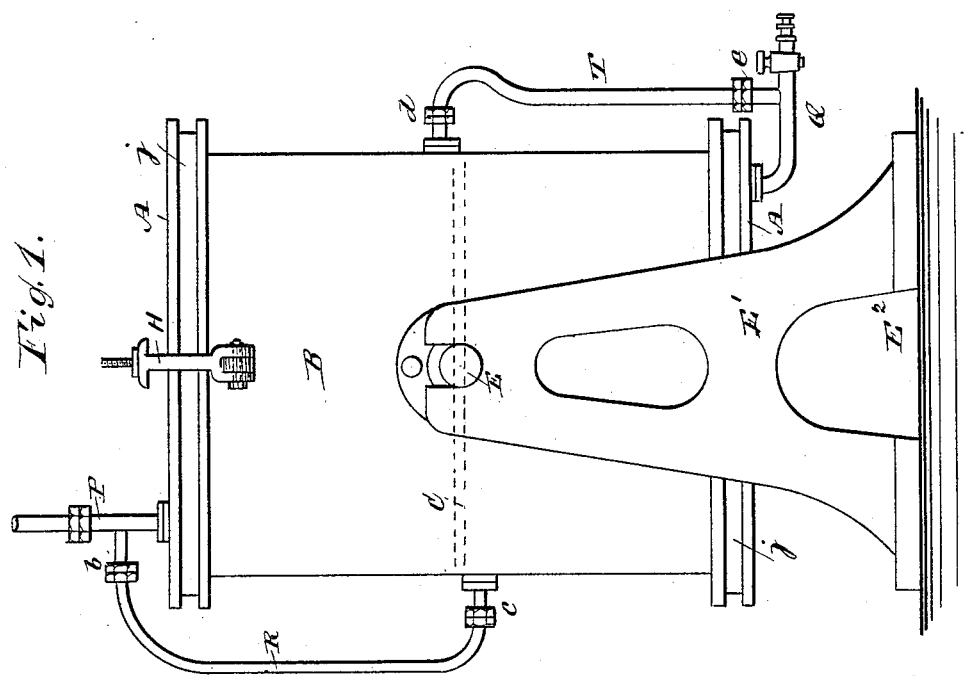
WITNESSES:
INVENTOR:
H. Stockheim
BY Munn & Co
ATTORNEYS.

UNITED STATES PATENT OFFICE.

HEINRICH STOCKHEIM, OF MANNHEIM, GERMANY.

MEANS FOR FILTERING.

SPECIFICATION forming part of Letters Patent No. 363,019, dated May 17, 1887.

Application filed March 4, 1886. Serial No. 193,945. (No model.)

*To all whom it may concern:*

Be it known that I, HEINRICH STOCKHEIM, of Mannheim, in the Empire of Germany, have invented a new and Improved Filter, of which the following is a full, clear, and exact description.

The object of my invention is to provide a new and improved filter which can be used equally well for filtering one liquid or for filtering two different liquids simultaneously.

The invention consists in various parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a side elevation of my improved filter. Fig. 2 is a central sectional elevation of the same.

The apparatus is provided at its middle with trunnions E, which are mounted on suitable standards, E', attached to the base-plate E². The apparatus consists of a receptacle, B, of any convenient shape and size, provided with a central partition, C, which divides the receptacle into two compartments, in each of which are two or more filtering-bodies, D, arranged between perforated plates L, one above the other. The several filtering-bodies D are kept separate from one another by supports S, placed between them.

The receptacle B is closed by two covers, A A, each of which is provided on its inner face with studs or projections K, which are covered on their inner ends with rubber blocks a, which rest on the perforated plates L. The covers A are held on the receptacle B, and are pressed inward by means of the screws H or by means of eccentrics F, as shown at the top and bottom of Fig. 2, respectively, and between each cover A and the corresponding rim of the receptacle is placed a rubber ring, j, making a tight joint. The upper and lower perforated plates L are provided on their peripheries with rubber rings M, which are in close contact with the inner side of the receptacle B, so as to prevent the liquids from flowing along the walls of the receptacle. The rubber rings M are provided with grooves on their inner sides, which form supports for the perforated plates L.

The covers A A are provided with tubes or pipes P and Q, respectively, having joint-pipes b and e, respectively, and branch pipes R and T, of which the pipe R connects by means of the joint-tube c with one compartment of the receptacle B, and the pipe T connects by means of the joint-pipe d with the other compartment of the receptacle B.

The operation is as follows: The receptacle B may be given a half-revolution on its trunnions E, so as to move the lower compartment to the top and the upper compartment to the bottom, if desired. If both compartments are to be used conjointly for filtering, the pipe-connections R and T with the pipes P and Q remain as shown in the drawings in Fig. 1, so that the liquid to be filtered flows into the pipe P and into the upper compartment, and at the same time through the branch tube R and the joint-pipe c into the lower compartment. The liquid which enters the upper compartment flows downward through the filtering-bodies D and through the joint-pipe d into the branch tube T, and the liquid which entered the lower compartment flows through the filtering-bodies D downward and into the pipe Q, so that the two filtered liquids pass into the same pipe, Q. If two different liquids are to be filtered, the connecting-pipes R and T are removed and the branch tubes b and e are closed by caps screwed over them, while the joint-tube d of the upper compartment is provided with a discharge-pipe and the joint-pipe c of the lower compartment is provided with an admission-pipe. One liquid now enters through the tube P on the upper cover A into the upper compartment, and flows off, after being filtered, through the joint-tube d of the said compartment, while the other liquid enters through the joint-pipe c of the lower compartment, and after having passed through the filtering-bodies flows off through the tube Q on the lower cover A. In this manner two different liquids—for instance, white wine and red wine—can be simultaneously filtered in the same apparatus.

The apparatus itself, with the exception of the filtering-bodies, may be made of any suitable material—such as wood or metal, or both together—and can also be made of any size and shape.

Having thus fully described my invention, what I claim as new, and desire to secure by Letters Patent, is—

1. In a filter, the combination of a receptacle divided into two compartments by a central partition, of the filtering-bodies placed above each other, and of perforated plates with two covers provided with studs or projections covered with rubber blocks, and with a device for pressing the covers inward, so that the latter exert a simultaneous pressure upon the said filtering-bodies, substantially as herein shown and described.

2. In a filter, the receptacle B, the central partition, C, the supports S, the filtering-bodies D, and the perforated plates L, provided with rubber rings M, in combination with the covers A, provided with the projections or studs K, the rubber blocks $a$, the rubber rings $j$, and a device for pressing the cover A inward, substantially as herein shown and described.

In testimony whereof I have signed my name to this specification in the presence of two subscribing witnesses.

HEINR. STOCKHEIM.

Witnesses:
AUGUSTUS BENAUL,
CARL BAUMANN.